United States Patent [19]

Gronvaldt

[11] Patent Number: 4,589,890
[45] Date of Patent: May 20, 1986

[54] HEAT RECOVERY METHOD AND APPARATUS

[75] Inventor: Jesper Gronvaldt, Crete, Ill.

[73] Assignee: Dedert Corporation, Olympia Fields, Ill.

[21] Appl. No.: 690,429

[22] Filed: Jan. 10, 1985

[51] Int. Cl.$^4$ ............................................. B01D 53/04
[52] U.S. Cl. ......................................... 55/59; 55/74; 55/180; 55/198; 55/208; 55/387
[58] Field of Search ................... 55/59, 61, 179, 180, 55/198, 208, 387, 74

[56] References Cited

U.S. PATENT DOCUMENTS

| | | | |
|---|---|---|---|
| 2,114,810 | 4/1938 | Ray | 34/35 |
| 2,181,672 | 11/1939 | Sutcliffe et al. | 502/55 X |
| 2,684,731 | 7/1954 | Starr, Jr. et al. | 502/55 X |
| 2,790,505 | 4/1957 | Dow | 55/179 X |
| 2,818,133 | 12/1957 | Rosenthal | 55/62 |
| 3,398,510 | 8/1968 | Pennington | 55/208 X |
| 3,850,592 | 11/1974 | Huffman | 55/179 X |
| 3,984,218 | 10/1976 | Patel et al. | 55/59 |
| 4,030,896 | 6/1977 | Wimber et al. | 55/33 |
| 4,165,972 | 8/1979 | Iles et al. | 55/179 X |
| 4,282,015 | 8/1981 | Bartoschek et al. | 55/208 X |
| 4,289,505 | 9/1981 | Hardison et al. | 55/59 |
| 4,416,798 | 11/1983 | Hager et al. | 210/189 X |
| 4,421,672 | 12/1983 | Rogge et al. | 55/59 X |
| 4,436,534 | 3/1984 | Seguy | 55/59 X |
| 4,440,549 | 4/1984 | Girard et al. | 55/59 |
| 4,444,727 | 4/1984 | Yanagihara et al. | 55/180 X |
| 4,536,197 | 8/1985 | Cook | 55/59 X |

FOREIGN PATENT DOCUMENTS

| | | | |
|---|---|---|---|
| 0091355 | 3/1983 | European Pat. Off. | |
| 460471 | 5/1928 | Fed. Rep. of Germany . | |
| 348006 | 5/1931 | United Kingdom | 55/59 |
| 398010 | 9/1933 | United Kingdom | 55/59 |
| 477657 | 1/1938 | United Kingdom | 55/59 |

OTHER PUBLICATIONS

Kirk–Othmer, Encyclopedia of Chemical Technology, Third Edition, vol. 12, 1980 Gravity Concentration to Hydrogen Energy, (p. 189).

Kirk–Othmer, Encyclopedia of Chemical Technology, Third Edition, vol. 20, 1982 Refractories to Silk, (pp. 78–79).

Kirk–Othmer, Encyclopedia of Chemical Technology, Third Edition; Supplement Volume, 1984, Alcohol Fuels to Toxicology, (pp. 694 and 819).

*Primary Examiner*—Robert Spitzer
*Attorney, Agent, or Firm*—Jerome D. Drabiak

[57] ABSTRACT

An improved waste heat-recovery method, and an apparatus embodying the method, are disclosed. Briefly, the improvement relates to recovery of latent heat. An example of how the method improves waste-heat recovery in a conventional solvent-adsorption process is discussed. The conventional process includes introducing steam, which possesses latent heat, into an activated-carbon solvent-adsorption bed to recover solvent from the carbon. A solvent-laden desorbate vapor, which also possesses latent heat, is thereby produced. The desorbate vapor is condensable to an aqueous solvent-laden fluid. The improvement comprises providing a body of liquid water, which is at a temperature lower than the desorbate vapor temperature, and passing the solvent-laden desorbate vapor and the body of liquid water together in a heat-transfer relationship, i.e., preferably through a heat transfer means, to transfer desorbate vapor latent heat into the body of water thereby heating the water. The improvement further includes flashing the heated body of liquid water to vaporize at least a portion thereof. The improvement includes subsequently passing the vaporized heated-water portion into the solvent-adsorption bed whereby a portion of the desorbate latent heat is recovered and re-used in the process.

8 Claims, 3 Drawing Figures

HEAT RECOVERY METHOD AND APPARATUS

BACKGROUND OF THE INVENTION

The present invention is directed to an improved heat recovery method and apparatus for transferring "waste" latent heat (contained in a gaseous or vapor stream) into a storage tank means containing a liquid medium for re-use of the waste heat. More particularly, the present invention is directed to a method and apparatus for recovering for re-use the latent heat exhausted from an activated-carbon solvent adsorber during steam regeneration thereof.

PRIOR ART

Solvent recovery, including regeneration of activated carbon, using steam (or other heat-containing vapor) has long been well known (German Patentschrift No. 460,471, granted 1928 ).

Also known in the art are U.S. pats. Nos. 2,181,672 to Sutcliffe et al., 2,684,731 to Starr et al., 2,818,133 to Rosenthal, 3,984,218, 4,416,798 to Hager et al. and 4,421,672 to Rogge et al., each of which discloses a method of condensing solvent-laden vapor, none of which discloses a method for recovering the latent heat contained by such vapor.

Well known latent heat recovery methods are disclosed, for example, in German Patentschrift No. 460,471, which discloses a method for pre-heating a process "feed" (or supply) stream using such latent heat, and in U.S. pat. No. 4,114,810 to Ray, which discloses a heat recovery method for pre-heating process equipment. EPO 0 091 355, too, discloses a method for recovery of process vapor latent heat.

A conventional method of recovering "waste" latent heat from a process vapor contemplates using a so-called "falling-film" condenser, which use, can at times necessitate a substantial capital investment.

Because of the relatively large mass of the adsorber and its carbon bed, it can be appreciated by those skilled in the art that a significant amount of energy is used simply as sensible heat in the initial heatup during each carbon bed solvent desorption cycle. This results in a reduction in thermal efficiency, which is more fully presented in Table I below.

Use of latent heat of a vapor is well known in the heat-pump art. However, because a heat-pump process involves the application of external power, and generally includes use of a compressor, for pumping heat from a lower temperature to a higher temperature, it will be clear to those skilled in the art that heat-pump art is unrelated to the art of the instant invention.

In light of the above-discussed art, new, improved and thermodynamically-efficient heat-recovery methods are currently in great demand.

OBJECTS AND SUMMARY OF THE INVENTION

It is therefore a general object of this invention to provide a novel method and apparatus for re-use of "waste" latent heat.

A more specific object is to provide a heat-recovery method and apparatus which includes means for transferring the waste latent heat into a storage tank means, containing a heat-storable liquid medium, for recovery and re-use of the "waste" latent heat.

Briefly, and in accordance with the foregoing objects, the heat recovery method of the present invention will now be summarized. In a process which includes introducing steam into an activated-carbon solvent-adsorption bed for recovering solvent (by a mechanism called "desorption") from the carbon and thereby producing a solvent-laden desorbate vapor possessing latent heat, which vapor, upon being condensed, is preferably separable into an aqueous phase and a solvent phase, the improvement comprises transferring the desorbate vapor latent heat into a tank of water, whereby a substantial portion of the desorbate latent heat is recoverable from the water and therefore available for re-use in the process. Apparatuses embodying the present invention are described below.

BRIEF DESCRIPTION OF THE DRAWINGS

The foregoing, as well as other objects, features and advantages of the present invention, will become more readily understood upon reading the following detailed description of the illustrated embodiments, together with reference to the drawings, wherein.

Throughout the drawings, like reference numerals refer to like parts.

DETAILED DESCRIPTION OF THE ILLUSTRATED PREFERRED EMBODIMENTS

Figure 1:
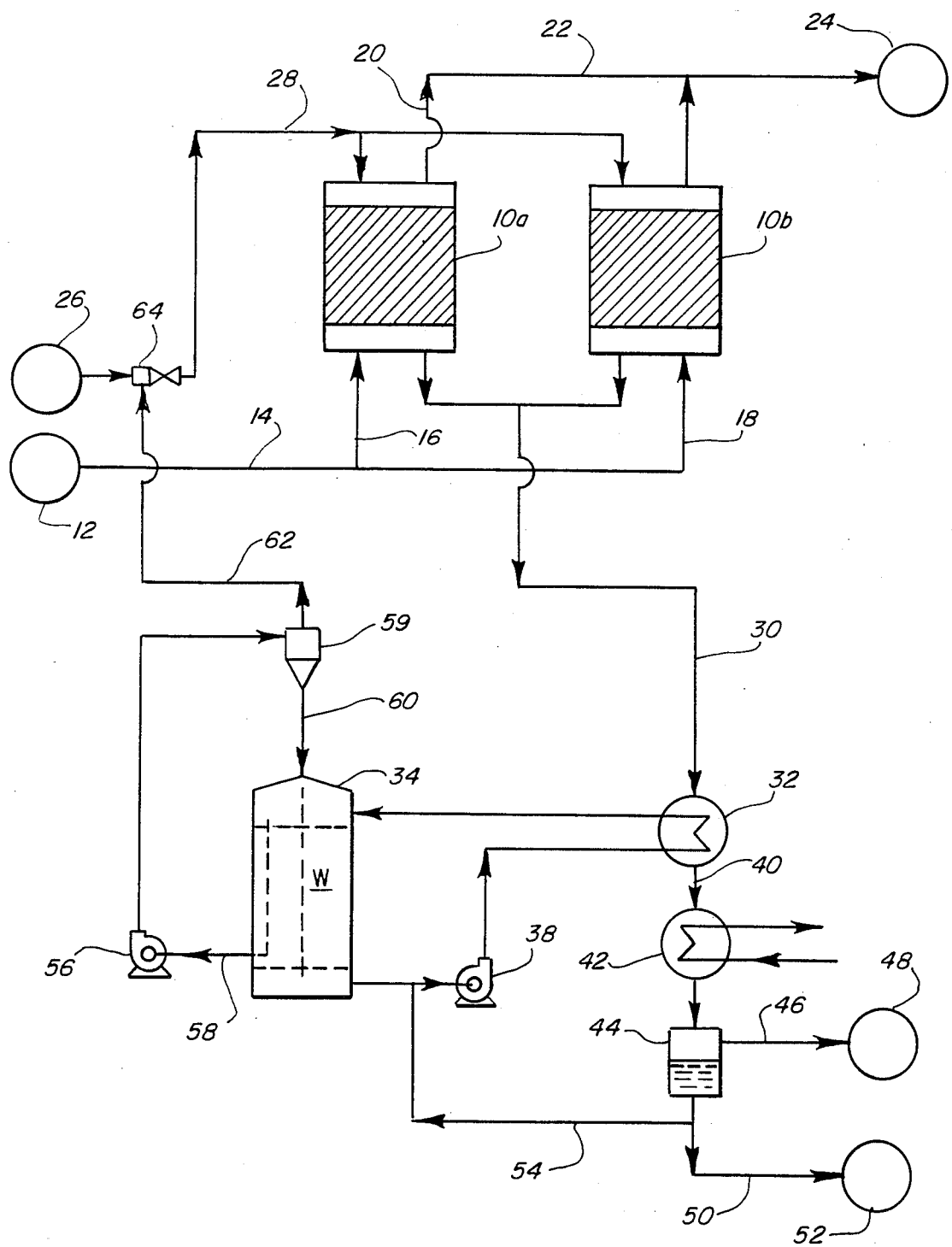
FIG. 1 is a process flow diagram of a first preferred embodiment of the present invention.

While the invention will be described in connection with preferred embodiments, it will be understood that it is not intended to limit the invention to those embodiments. On the contrary, it is intended to cover all alternative, modifications and equivalents as may be included within the spirit and scope of the invention as defined by the appended claims.

In a process (please refer to FIG. 1) for recovering solvent from "spent" activated carbon, it is conventional to operate a pair of activated-carbon beds 10a, 10b in an alternating fashion. That is, solvent-laden vapor, generally solvent-laden air, from a source 12 is transferred via a conduit 14, having first and second conduit branches 16, 18 into the first or second activated-carbon bed 10a, 10b.

Throughout this application, activated carbon is referred to as "spent" when its solvent-recovery efficiency is reduced to a predetermined value.

The first activated-carbon bed 10a receives the solvent-laden vapor via the conduit branch 16, adsorbs the solvent onto the activated carbon contained therein, and transfers solvent-free vapor (i.e. solvent-free air) via a discharge conduit 20 into a manifold 22 for transfer to a solvent-free vapor site 24 for re-use or discharge to atmosphere (as desired).

After the activated carbon in the first activated-carbon bed 10a is reduced in efficiency to the predetermined value (as mentioned above), the solvent-laden vapor flow is redirected from the first conduit branch 16 to the second conduit branch 18 for transfer of the vapor into the second activated-carbon bed 10b; and the activated carbon contained within the first activated-carbon bed 10a is regenerated using steam.

Steam, from a source 26, is introduced via a conduit 28 into the first activated-carbon bed 10a for regenerating the activated carbon contained therein.

It will be noted that the conventional method of introducing steam into the activated-carbon bed 10a is counter-current to what the flow of the solvent-laden vapor had been. However, those skilled in the art know that co-current flow can be arranged if desired.

As the steam passes through the first activated-carbon bed 10a, a relatively small portion (i.e. about 10%) of the latent heat of the steam is transferred to the activated carbon and the solvent which had been adsorbed thereon. Introduction of this steam, of course, results in the evaporation of the solvent and the transfer (of the evaporated solvent) into the steam, thereby resulting in the regeneration of the activated carbon. The evaporated solvent is carried out of the first activated-carbon bed 10a by the exiting steam via a conduit 30 and introduced into a hot condenser 32. (The exiting steam is now called "desorbate" because it contains solvent vapors which have been desorbed from the activated carbon.)

A heat storage tank 34 containing water W includes a pump 38 for pumping the heat storage tank water W from the heat storage tank 34 through the hot condenser 32 for recovery of the desorbate latent heat, and then for pumping the water W back into the heat storage tank 34 for storage and re-use of the desorbate latent heat.

The solvent-laden desorbate, now reduced in temperature and partially condensed, exits the hot condenser 32 via a conduit 40, is further reduced in temperature as it passes through a cold condenser 42, and is introduced into a decanter 44 which separates the immiscible solvent phase from the aqueous phase for recovering the solvent.

When the solvent is less dense than water, a decanter upper-phase discharge conduit 46 transfers the recovered solvent to a solvent storage area 48 for further use, and a decanter lower-phase discharge conduit 50 transfers the aqueous phase to a storage area 52 for further use or discharge (as desired).

Optionally, a portion of the decanter discharge aqueous phase (called "decantate") can be recycled via a conduit 54 to the suction inlet of the pump 38 (if desired). The aqueous phase being conveyed by the conduit 54, of course, includes some solvent; and those skilled in the art can appreciate that the thus recycled decantate may at times be a relatively small portion of the total aqueous phase being discharged from the decanter 44.

A second storage tank water transfer pump 56, connected by a conduit 58 to the heat storage tank 34, transfers the storage tank water W (which thus at times may include the above-described recycled aqueous phase from the decanter 44) into a partially-evacuated main entrainment separator 59 wherein some evaporation, also called "flashing", takes place. From the main entrainment separator 59, liquid (essentially water) is conveyed via a conduit 60 back into the storage tank 34, and vapor (comprising water vapor and solvent vapor) is drawn through a conduit 62 into the suction inlet of a thermocompressor 64.

Steam, from the steam source 26, drives the thermocompressor 64 in a well-known manner. Thermocompressor exhaust is conveyed via the conduit 28 (as above described) into the activated-carbon bed 10a or 10b, whichever is being regenerated.

Thus, substantially all of the desorbate latent heat being exhausted from a bed 10a or 10b is transferred into and contained by the storage tank water W for further use, regardless of whether a bed 10a or 10b is at the beginning portion or any other portion of its solvent-desorption cycle.

Although the present invention, at the beginning portion of the desorbate latent heat transfer cycle (which corresponds to the carbon-bed solvent-desorption cycle, mentioned above) is relatively more efficient than a conventional falling-film evaporator, it has been found that another efficient method of reclaiming desorbate latent heat, in addition to the above-described method, includes combining the above-described latent heat-storage invention with a falling-film evaporator apparatus. This combination, will now briefly be described.

Figure 2:
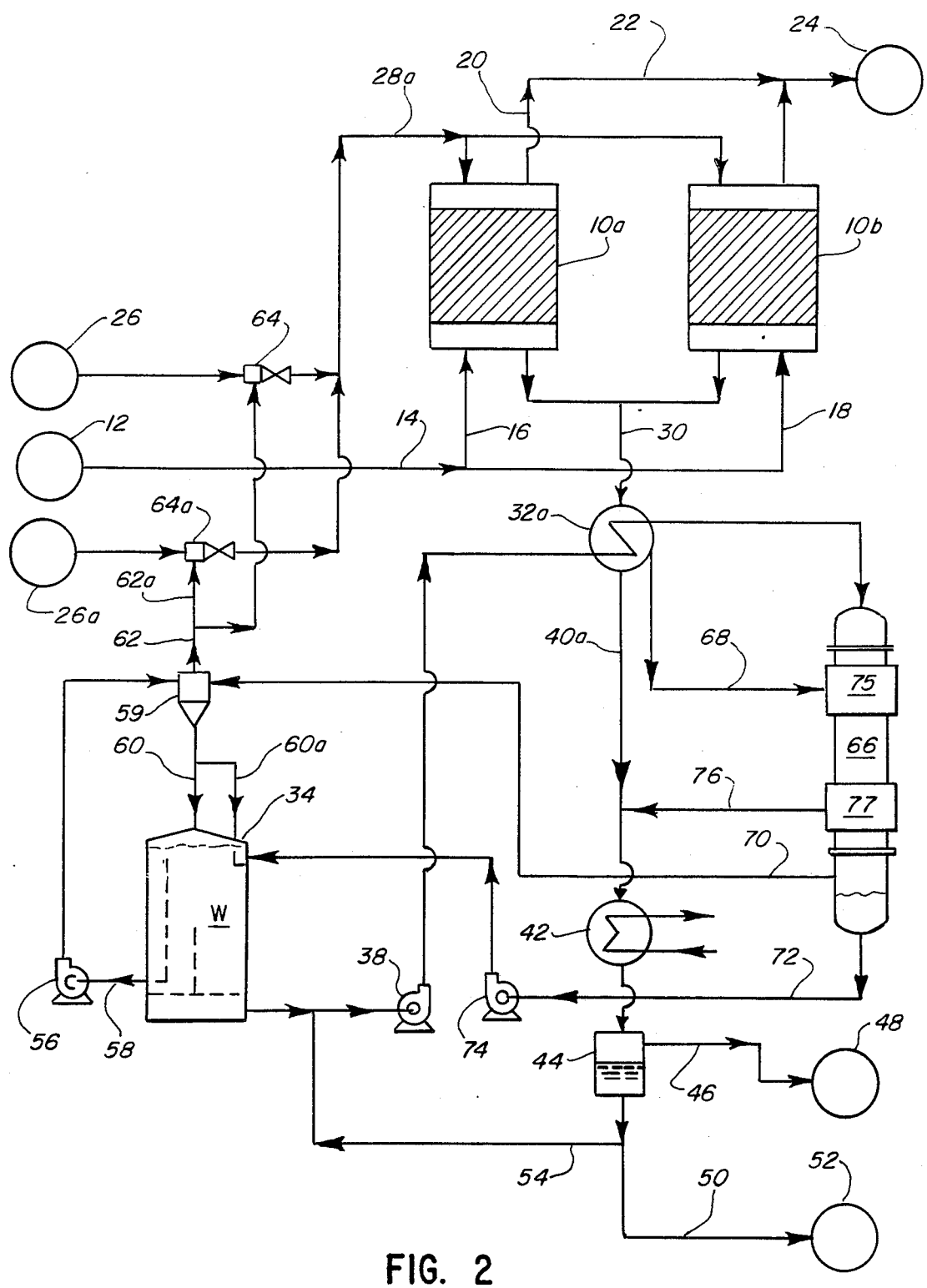
FIG. 2 is a process flow diagram of a second preferred embodiment of the present invention.

Referring to FIG. 2, it will be noted that the process depicted in FIG. 1 has been modified to incorporate a falling-film (sometimes also referred to as a "thin" film) evaporator 66. Accordingly, process alterations necessitated by the inclusion of the falling-film evaporator 66 will now briefly be discussed.

Although it has been found that the above-discussed invention which incorporates the water storage tank 34 is, for the above-presented reasons, more efficient than a conventional falling-film evaporator, it will be appreciated, particularly after referring to the below-presented table (Table I), that the overall effect of combining elements of a "conventional" falling-film evaporator-based process with the latent heat storage process of the invention depicted in FIG. 1 is to produce a latent heat recovery process which is relatively more efficient than either the above-described storage process or the conventional evaporator-based process considered separately. Table I summarizes the relative efficiencies of these three processes.

TABLE I

| TIME PERIOD | EVAPORATOR-BASED PROCESS | | | INSTANT INVENTION STORAGE PROCESS | | | COMBINATION EVAP./STORAGE PROCESS | | |
|---|---|---|---|---|---|---|---|---|---|
| | Fresh Steam Added | Flash Loss | Condensing Gain | Fresh Steam Added | Flash Loss | Condensing Gain | Fresh Steam Added | Flash Loss | Condensing Gain |
| First $\frac{1}{3}$ of Steaming Cycle (Heat-up) | 1 | 0 | 0 | .5 | .5 | 0 | .5 | .5 | 0 |
| Remaining $\frac{2}{3}$ of Steaming Cycle[1] | .82 | 1.18 | 2 | 1 | 1 | 2 | .82 | 1.18 | 2 |
| TOTALS | 1.82 | 1.18 | 2 | 1.5 | 1.5 | 2 | 1.32 | 1.68 | 2 |
| % Steam Addition[2] | (1.82/3) × 100 = 61% | | | (1.5/3) × 100 = 50% | | | (1.32/3) × 100 = 44% | | |

TABLE I-continued

| | EVAPORATOR-BASED PROCESS | | | INSTANT INVENTION STORAGE PROCESS | | | COMBINATION EVAP./STORAGE PROCESS | | |
|---|---|---|---|---|---|---|---|---|---|
| TIME PERIOD | Fresh Steam Added | Flash Loss | Condensing Gain | Fresh Steam Added | Flash Loss | Condensing Gain | Fresh Steam Added | Flash Loss | Condensing Gain |
| Water Made[3] | (2−1.18) = .82 | | | (2−1.5) = .5 | | | (2−1.68) = .32 | | |

[1] To obtain individual values for second or third ⅓ rds of the steaming cycle, divide the presented value by 2.

[2] Total fresh steam added to process as compared to conventional process.

[3] Water Made = Total condensing gain less total flash loss.

Solvent-laden desorbate (please refer to FIG. 2) from the activated-carbon bed 10a or 10b is introduced via the conduit 30 into an auxiliary hot condenser 32a which functions much like the above-described hot condenser 32, except that the partially-cooled desorbate exiting the auxiliary hot condenser 32a is divided between a first takeaway conduit 40a, which functions much the same as the above-described conduit 40, and a second takeaway conduit 68 supplying the falling-film evaporator 66.

It can be appreciated that the partially-cooled desorbate flow to either the cold condenser 42 or the falling-film evaporator 66 is cyclic, depending on whether a bed 10a or 10b is at the beginning or end of its solvent-desorption cycle.

The gaseous portion of the solvent-laden desorbate, further reduced in temperature through operation of the falling-film evaporator 66, is drawn from the falling-film evaporator 66 via a conduit 70 subjected to partial vacuum, and is introduced into the main entrainment separator 59 for recovery of solvent and separation of gaseous and liquid phases as above described.

The storage tank water W from the heat storage tank 34 is transferred from the tank 34 via the pump 38 through the auxiliary hot condenser 32a and into the top of the falling-film evaporator 66 for desorbate latent heat recovery, storage and re-use purposes. The flow of the storage tank water W (into the evaporator 66) preferably is located on the "tube" side of the tubes (not shown) of the evaporator 66, and the condensing desorbate preferably flows on the "shell" side. The storage tank water W is discharged from the bottom of the evaporator 66, and is conveyed via a conduit 72 to the suction inlet of a third pump 74 which returns the storage tank water W into the tank 34.

Solvent-laden desorbate from the auxiliary hot condenser 32a is introduced into the evaporator upper bustle 75, and temperature-reduced desorbate (which now includes liquid desorbate and entrained vapor) is conveyed via a conduit 76 exiting the evaporator lower bustle 77 to the cold condenser 42.

During the warm-up phase of a normal desorption cycle, desorption steam is supplied in the following manner: auxiliary steam from the auxiliary steam source 26a supplies steam to an auxiliary thermocompressor 64a. This compressor draws a comparatively hard vacuum at the entrainment separator 59 on warm water supplied by warm water pump 56 via suction line 58 from the warm top of water reservoir 34. That vacuum causes steam flash vapor to form, which then flows in line 62a to be pressure-and-temperature-boosted to desorbing conditions by thermocompressor 64a for flow to either carbon bed 10a or 10b via pipe 28a. Only a small amount (about 2%) of the water subjected to flash evaporation actually evaporates, however. The rest of the water, now reduced in temperature, leaves entrainment separator 59 via pipe 60 and is led to the cool bottom of storage tank 34.

It should be noted that during the regular desorption heat recovery phase as described previously, entrainment separator 59 does not experience any flashing but merely separates out droplets carried over in the vapor generated in evaporator 66 via pipe 70. These warm droplets are collected in separator 59 and are led via pipe 60a to the warm top of storage tank 34, just as is the majority of the un-evaporated (but heated) water via pump 74 as previously described.

Figure 3:
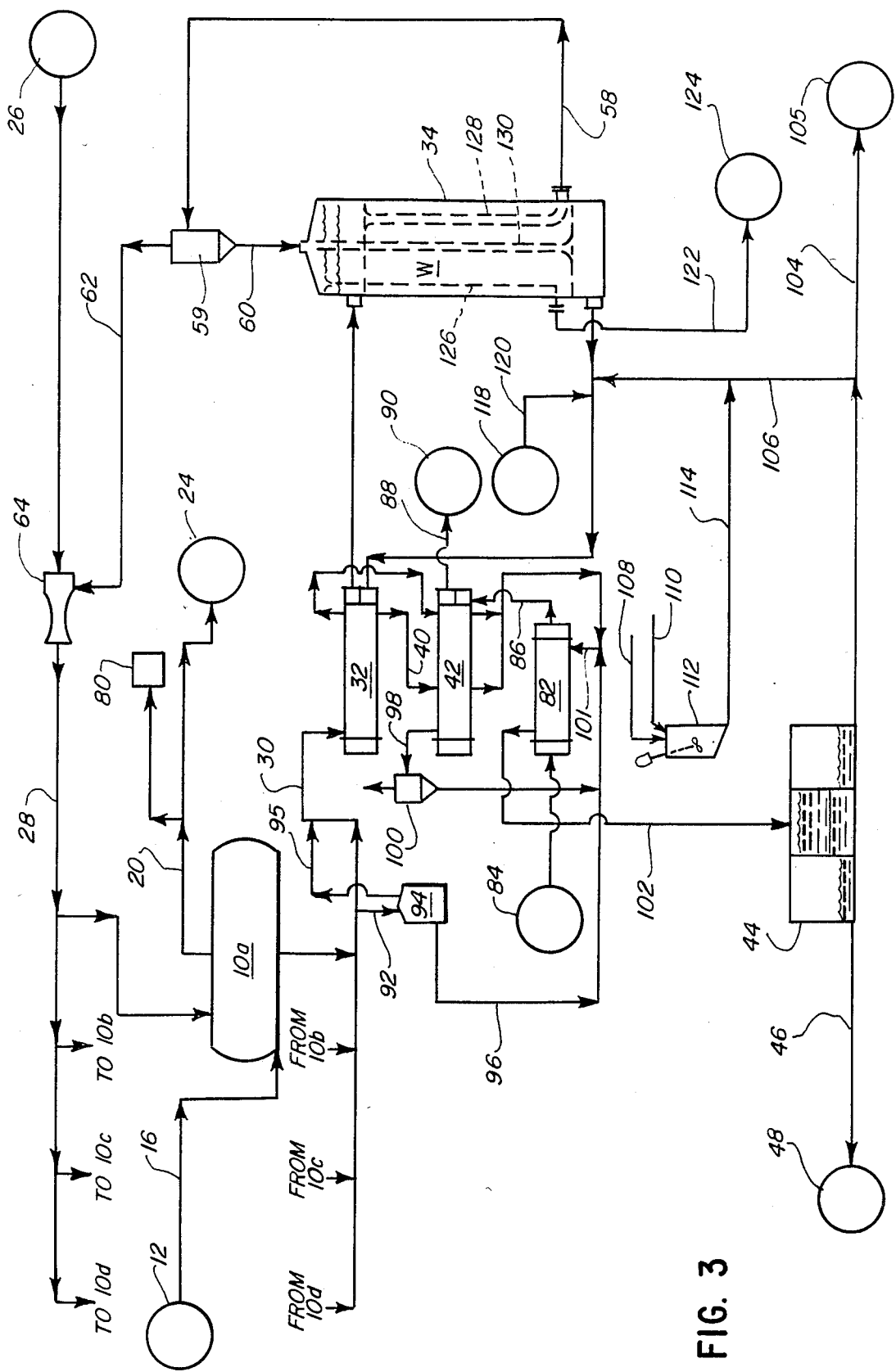
FIG. 3 is a more detailed process flow diagram of the invention briefly presented in FIG. 1.

Please now refer to FIG. 3, where a more detailed description of the preferred embodiment (briefly presented in FIG. 1) will be discussed.

Solvent-laden air from the source 12 (e.g. exhaust air from a printing plant's main blowers, not shown) is transferred via the conduit 16 into the first activated-carbon adsorption bed 10a. Solvent-free air exits the activated-carbon bed 10a via the conduit 20. The conduit 20 transfers a first portion of the solvent-free air to the solvent-free vapor site 24 (as above described) The conduit 20 also transfers a second portion of the solvent-free air to an air analyzer 80 (for compositional analysis), for controlling steam flow into the activated-carbon bed 10a.

The solvent-free air, thus transferred to the site 24, is preferably vented to atmosphere, because current safety considerations preclude re-use by recycling.

High pressure steam from the source 26, reduced in pressure to about 100 pounds per square inch gauge (psig), is transferred through the thermocompressor 64 and via the conduit 28 into the activated-carbon bed 10a for carbon regeneration purposes. The high pressure steam is reduced in pressure from about 100 psig to about 15.6 pounds per square inch absolute (psia) as it passes through the thermocompressor 64. The 15.6 psia steam, now at about 241° F., is also available for other activated-carbon beds 10b, 10c and 10d (not shown in FIG. 3).

A first portion of the solvent-laden desorbate, exiting the activated-carbon bed 10a, preferably at a temperature of about 205° F. minimum, is transferred via the conduit 30 into the hot condenser 32, and from the hot condenser 32 is transferred into the cold condenser 42 via the conduit 40.

It is desirable to further cool the temperature-reduced (now partially condensed) desorbate exiting the cold condenser 42 in a subcooler 82 (preferably to a temperature of about 100° F.) before transfer to the decanter 44. Accordingly, the subcooler 82 is supplied with cooling tower water from a source 84. From the subcooler 82, the cooling tower water is transferred via a conduit 86 into the cold condenser 42, and is thereafter discharged from the cold condenser 42 via a conduit 88 to a once-used cooling-tower water storage area 90 for further use.

A second portion of the desorbate vapor exiting the activated-carbon bed 10a is transferred via a conduit 92 through a trap tank 94 and via a conduit 95 into the hot condenser 32. Liquified desorbate exiting the trap tank 94 is conveyed via a conduit 96 to the subcooler 82.

Entrained vapors drawn into the cold condenser 42 are vented via a conduit 98 into a second entrainment separator 100. Demisted vapors from the second entrainment separator 100 are either vented or recycled to the process.

Liquid desorbate from the trap tank 94, liquid exiting the second entrainment separator 100, and liquid exiting the cold condenser 42, is combined and introduced via a conduit 101 into the subcooler 82. Exiting the subcooler 82, the liquid is transferred via a conduit 102 into the decanter 44.

The aqueous phase (called "decantate") from the decanter 44 is transferred, at a temperature of about 100° F., via a conduit 104 to a storage area 105 for re-use (as desired), or is recycled via a conduit 106 into the hot condenser 32.

Cold soft water transferred by a conduit 108 and caustic flakes transferred via a conveyor means 110 are introduced into an agitated mixing tank 112 thereby making a caustic solution. From the mixing tank 112, caustic-containing water is introduced via a conduit 114 into the conduit 106.

If desired, additional cold soft water from a source 118 can be used as make-up water, and can be introduced via a conduit 120 to the water W being circulated from the storage tank 34 through the hot condenser 32 (and back into the storage tank 34). Flow of such additional cold soft water (if used) is preferably controlled by water level in the storage tank 34.

Warmed water, drawn from the storage tank (water) upper surface, preferably at a temperature of about 200° F., exits the heat storage tank 34 via a conduit 122 and is transferred to a storage area 124 for further use or for treatment (as desired). A conduit 126, within the storage tank 34, preferably draws this water from the storage tank water upper surface and discharges it (as can be seen in FIG. 3) near the base of the storage tank 34.

It will further be noted that the storage tank water W being supplied to the entrainment separator 59 is drawn from an inner upper portion of the storage tank 34 by means of an internal, upstanding conduit 128, for purposes of maximizing the effect of "flashing" occurring in the main separator 59. It will also be noted that liquid exiting the main entrainment separator 59 is directed by a conduit 130 (a vertically disposed "barometric leg"), located within the storage tank 34, through the tank 34 to the base of the tank 34.

It will be understood—from the many conduits presented in the figures—that all such conduits can, and many do, include valves (not shown) for controlling fluid flow therethrough. Further, it will be understood that FIG. 3 does not include pumps, for the sake of clarity. Location of such valves and pumps, however, will be obvious to those skilled in the art.

Also, it will be understood that instrumentation and other process control details (also not shown), for controlling operation of the above-disclosed invention, will similarly be obvious to those skilled in the art.

Upon reading this specification, the scope of the present invention will become clear to those skilled in the art.

In one application of the present invention, for example, it was desirable to construct the storage tank 34 such that it had a 12-foot internal diameter and an effective height so as to store over 25,000 gallons of water. Such a storage tank can continuously store for further re-use substantially all (i.e. at least 95%) of the 25,000 to 28,000 pounds per hour of desorbate (containing latent heat) being discharged from a conventional activated-carbon bed 10a or 10b. In a setting where heat recovery efficiency is at a premium, those skilled in the art will know that such a degree of heat recovery is highly desirable.

What has been illustrated and described herein is a novel heat recovery method and apparatus. While the method and apparatus of the present invention have been illustrated and described with reference to preferred embodiments, the present invention is not limited thereto. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

What I claim as my invention is as follows:

1. In a process which includes introducing water vapor possessing latent heat into a solvent-adsorption bed for recovering the solvent and thereby producing a solvent-laden desorbate vapor also possessing latent heat, the improvement which comprises:
providing a body of liquid water at a temperature lower than the temperature of the solvent-laden desorbate vapor;
passing the solvent-laden desorbate vapor in a heat-transfer relationship with the body of liquid water so as to transfer heat onto the body of liquid water;
flashing the heated body of liquid water to vaporize at least a portion thereof; and
passing the vaporized heated-water portion into the solvent-adsorption bed,
whereby a portion of the desorbate latent heat is recovered from the vaporized heated-water portion and re-used in the process.

2. In a process which includes introducing steam possessing latent heat into an activated-carbon solvent-adsorption bed for recovering the solvent from the carbon and thereby producing a solvent-laden desorbate vapor also possessing latent heat, said desorbate vapor being condensable and separable into aqueous and non aqueous phases, the improvement which comprises:
providing a body of liquid water at a temperature lower than the temperature of the solvent-laden desorbate vapor;
passing the solvent-laden desorbate vapor in a heat-transfer relationship with the body of liquid water so as to transfer heat to the body of liquid water;
transferring the heated body of liquid water into storage-tank means for containing the heated body of liquid water;
transferring the heated body of liquid water from the storage-tank means to means for flashing the heated body of liquid water;
flashing the heated body of liquid water to vaporize at least a portion thereof; and
passing the vaporized heated-water portion into the solvent-adsorption bed, whereby a portion of the desorbate latent heat is recovered from the vaporized heated-water portion and re-used in the process.

3. In a process which includes introducing steam possessing latent heat into an activated-carbon solvent-adsorption bed for recovering the solvent from the carbon and thereby producing a solvent-laden desorbate vapor also possessing latent heat, said desorbate vapor being condensable and separable into aqueous and non aqueous phases, the improvement, in combination, which comprises:

providing a body of liquid water at a temperature lower than the temperature of the solvent-laden desorbate vapor;

providing means for transferring heat from the solvent-laden desorbate vapor into the body of liquid water;

passing the solvent-laden desorbate vapor and the body of liquid water through the heat-transfer means in a heat-transfer relationship so as to transfer desorbate vapor latent heat into the body of liquid water thereby heating the body of liquid water;

transferring the heated body of liquid water into storage-tank means for containing the heated body of liquid water;

transferring the heated body of liquid water from the storage-tank means to means for flashing the heated body of liquid water;

flashing the heated body of liquid water to vaporize at least a portion thereof; and passing the vaporized heated-water portion into the solvent-adsorption bed, whereby a portion of the desorbate latent heat is recovered from the vaporized heated-water portion and for re-used in the process.

4. The process of claim 3 wherein said heat transfer means includes a falling-film evaporator.

5. In an apparatus which includes means for introducing water vapor possessing latent heat into a solvent-adsorption bed for recovering the solvent and thereby producing a solvent-laden desorbate vapor also possessing latent heat, the improvement which comprises:

means for passing the solvent-laden desorbate vapor in a heat-transfer relationship with a body of liquid water so as to transfer heat into the body of liquid water, the body of liquid water being at a temperature lower than the temperature of the solvent-laden desorbate vapor;

means for flashing the heated body of liquid water to vaporize at least a portion thereof; and means for passing the vaporized heated-water portion into the solvent-adsorption bed, whereby a portion of the desorbate latent heat is recovered from the vaporized heated-water portion and re-used in the apparatus.

6. In an apparatus which includes means for introducing steam possessing latent heat into an activated-carbon solvent-adsorption bed for recovering the solvent from the carbon and thereby producing a solvent-laden desorbate vapor also possessing latent heat, said desorbate vapor being condensable and separable into aqueous and non aqueous phases, the improvement, in combination, which comprises:

means for containing a body of liquid water;

means for passing the solvent-laden desorbate vapor in a heat transfer relationship with the body of liquid water so as to transfer heat to the body of liquid water, the body of liquid water being at a temperature lower than the temperature of the solvent-laden desorbate vapor;

means for transferring the heated body of liquid water into the water-containing means;

means for flashing the heated body of liquid water to vaporize at least a portion thereof;

means for transferring the heated body of liquid water from the water-containing means to the flashing means to produce a vaporized heated-water portion; and means for passing the vaporized heated-water portion into the solvent-adsorption bed, whereby a portion of the desorbate latent heat is recovered from the vaporized heated-water portion and re-used in the apparatus.

7. In an apparatus which includes means for introducing steam possessing latent heat into an activated-carbon solvent-adsorption bed for recovering the solvent from the carbon and thereby producing a solvent-laden desorbate vapor also possessing latent heat, said desorbate vapor being condensable and separable into aqueous and non aqueous phases, the improvement, in combination, which comprises:

means for containing a body of liquid water;

means for transferring heat from the solvent-laden desorbate vapor into the body of liquid water, the body of liquid water being at a temperature lower than the temperature of the solvent-laden desorbate vapor;

the heat-transfer means including means for passing the solvent-laden desorbate vapor and the body of liquid water therethrough in a heat-transfer relationship so as to transfer desorbate vapor latent heat into the body of liquid water thereby heating the body of liquid water;

means for transferring the heated body of liquid water into the water-containing means;

means for flashing the heated body of liquid water to vaporize at least a portion thereof;

means for transferring the heated body of liquid water from the water-containing means to the flashing means to produce a vaporized heated-water portion; and means for passing the vaporized heated-water portion into the solvent-adsorption bed, whereby a portion of the desorbate latent heat is recovered from the vaporized heated-water portion and for re-used in the apparatus.

8. The apparatus of claim 7 wherein said heat transfer means includes a falling-film evaporator.

* * * * *